Nov. 9, 1965  A. A. L. RAYMOND  3,216,685

CABLE FASTENER

Filed Nov. 12, 1963

Inventor:
Alain Achille Louis Raymond,
by Gordon Needleman
Att'y.

United States Patent Office 3,216,685
Patented Nov. 9, 1965

3,216,685
CABLE FASTENER
Alain A. L. Raymond, Grenoble, France, assignor to
A. Raymond, Grenoble, France, a firm
Filed Nov. 12, 1963, Ser. No. 322,715
Claims priority, application France, Nov. 12, 1962,
915,128, Patent 1,347,130
4 Claims. (Cl. 248—74)

The present invention relates generally to fastening devices and more specifically to a device for fastening cables or the like to a support.

An object of the present invention is to provide a fastening device for mounting devices with an elongated form along a support whereby the devices are spaced from the support.

The current method of mounting cables, tubes, rods etc., is generally by means of collars or flanges which are provided with sealing clips.

In the applicant's device a flexible clamp designed to partially encompass the elongated device and includes a collar provided with clips to engage the fastener on a stem, the stem in turn being engaged with a support. Generally speaking, the inventor's fastener is made of a band of flexible material, for example, spring steel, suitably cut out and conformed in such a way as to include a loop forming clamp having a circumference of more than 180° and also a fold adjacent the loop which connects it with the collar.

The cable or similar object is partially circumscribed by the loop which has a tongue with a smaller radius of curvature than the loop which assures excellent holding over a wide range of diameter, the range lying between twice the radius of the minimum curvature of the dome and the maximum diameter which the loop may assume.

Other objects of the invention will, in part, be obvious and will, in part, appear hereinafter.

Figure 1:
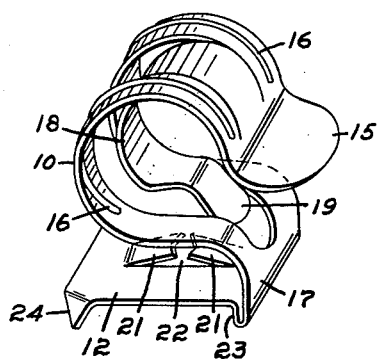
FIG. 1 is a perspective of the fastener.

Referring to the drawings there is shown a fastener made with the aid of a band of flexible material, such as spring steel, having a configuration in profile essentially in the form of the Arabic numbers "2" or "5."

The fastener has two principle parts, namely, an open loop 10 essentially tubular in form, extending about a center 270° and forming a clamp in which the object 11 will be fixed, and a collar or base portion 12 by which the fastener is mounted on a stem 13 which is fixed to a support 14, such as a fold or partition.

Figure 2:
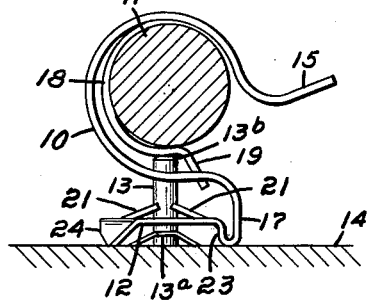
FIG. 2 is a side elevation of the fastener showing the wire or the like in section and engaged with a support which is shown in section and a stem shown in side elevation.
Figure 3:
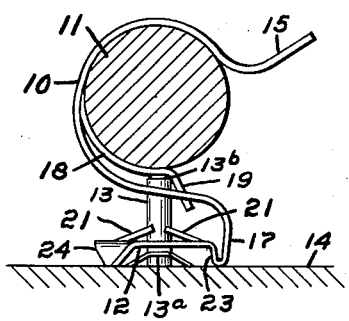
FIG. 3 is a view similar to FIG. 2 showing the engagement of a larger diameter object.

The loop 10 as shown in FIGS. 1 through 3 is terminated at its free extremity by a raised edge 15, designed to facilitate the engagement of the object 11 and the loop 10. It may have laterally reinforced ribs 16 as shown in FIG. 1. At the other end from its free extremity, it is joined to the collar 12 by a side 17 more or less inclined to the base of the collar.

Figure 4:
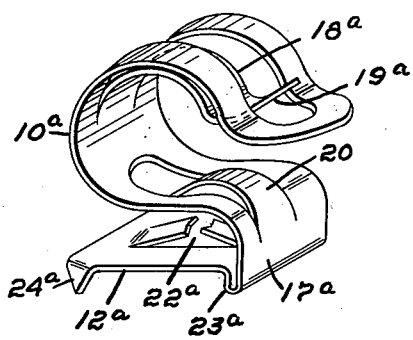
FIG. 4 is a perspective view of a variation of the fastener shown in FIG. 1.
Figure 5:
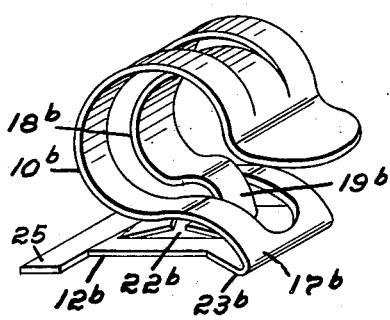
FIG. 5 is a perspective of another variation of the fastener shown in FIG. 1.

A tongue 18 is cut out from the material of the loop 10. The tongue 18 has a free terminal end which is spaced from the loop 10 and as shown in FIG. 1 may be directed toward the collar 12 or as shown in FIG. 4 and numbered 18a may be directed away from the collar 12 and somewhat above an external surface of the loop 10. The free terminal end 19 of the tongue 18 is folded towards the exterior of the loop 10 in order to facilitate the engagement of the object 11. The radius of curvature of the tongue 18 is less than the radius of the curvature of the loop. The tongue 18 can extend along and spaced from the major part of the loop 10 as shown in FIGS. 1 and 5. It can also operate if it extends from the body of the loop 10 by only about half of this length as shown in FIG. 4. The part of the loop remaining may then, although not absolutely necessary, have an auxiliary tongue 20 whose median part projects in an arc at the entrance of the loop 10a.

The collar 12 has oblique clips 21 whose formed edges are cut out in acute angles and are designed to engage against the stem 13. The oblique clips 21 are in spaced opposed relation to each other and extend from a wall defining an aperture 22 through the collar 12. The stem 13 can be smooth or provided with peripheral grooves in order to improve the engagement particularly in the case of stems of hard material, such as treated steel. To engage the collar 12 on the support 14, even if the stem 13 has a foot 13a, as shown in FIG. 2, the connection of the collar 12 with the side 17 may be brought about by a fold or bight 23 more or less pronounced and the free edge of the collar is also folded toward the support whether by its prongs or barbs as represented by the numeral 24 in FIGS. 1 through 3 and the variation shown in FIG. 4 as 24a or along its terminal edge by tabs numbered 25 as shown in FIG. 5. In the first case one can keep the fastener from turning about the axis of the stem 13 by lightly driving the apex of the prongs or barbs 24 into the support 14. In the fasteners shown in FIGS. 1 and 4 the tongue 18 or the tongues 18a and 20 are situated opposite the opening 22 of the collar 12 through which the stem 13 passes. This gives the fastener two distinct advantages. On the one hand if the stem 13 is of sufficient length, the terminal end 13b of the stem 13 will abut against the undersurface of the tongue 18 as shown in FIG. 2 or against the tongue 20 in the variation disclosed in FIG. 4 and will assure a tight engagement of the fastener on the object 11. On the other hand the stem 13 allows the object 11 to be maintained at a predetermined distance from the support 14. The side 17 which connects the collar 12 to the loop 10 may then bend more or less as shown in FIGS. 2 or 3. In FIG. 2 where the object 11 is of small enough diameter, the angle which the side 17 makes with the support 14 is on the order of 90°. With a larger diameter object as shown in FIG. 3 this angle will become more acute.

While there has been illustrated and described a preferred embodiment of the invention, it should be understood that the invention is best described by the following claims.

I claim:
1. A fastening device comprising:
   (a) a loop portion having a U-shaped configuration terminating in a free end,
   (b) a tongue formed from the material of said loop portion and extending into the area defined by said loop portion for the major portion of its length and
   (c) a base portion attached to said loop portion and having means for engaging a support, said loop portion opening in a lateral direction in relation to the horizontal axis of said base portion.
2. A fastening device as set forth in claim 1 wherein said tongue and said loop portion are in spaced overlying relationship to said base portion.

3. A unitary fastening device comprising:
  (a) a loop portion having an arcuate configuration terminating in a first free end;
  (b) at least one resilient tongue formed from the material of said loop portion, said tongue being of less radius of curvature than said loop and being in spaced, close relation to said loop and being within the area defined by said loop portion for the major portion of its length, and said loop portion having a second tongue having a second free end in spaced relation to said first free end;
  (c) a connector portion connecting said loop portion and a base portion, said base portion having means for engaging a support, and said second free end lying between the plane of said first free end and said base portion; said loop portion opening in a lateral direction in relation to the horizontal axis of said base portion.

4. The combination of a support having a stem extending therefrom and a fastening device, said fastening device comprising
  (a) a loop portion having a U-shaped configuration terminating in a free end,
  (b) a tongue formed from the material of said loop portion and extending into the area defined by said loop portion for the major portion of its length,
  (c) a base portion attached to said loop portion and having means for engaging a support,
  (d) said loop portion opening in a lateral direction in relation to the horizontal axis of said base portion; and
  (e) said stem engaging against a portion of said tongue.

References Cited by the Examiner

UNITED STATES PATENTS

| | | | |
|---|---|---|---|
| 2,166,916 | 7/39 | Lombard | 248—316.5 |
| 2,494,881 | 1/50 | Kost | 248—365 |
| 2,588,251 | 3/52 | Kost | 248—74 X |
| 2,712,917 | 7/55 | Flora et al. | 248—73 |
| 3,066,902 | 12/62 | Conil | 248—68 X |

FOREIGN PATENTS

| | | |
|---|---|---|
| 1,121,357 | 4/56 | France. |
| 583,223 | 3/44 | Great Britain. |

CLAUDE A. LE ROY, *Primary Examiner.*